United States Patent Office 2,875,176
Patented Feb. 24, 1959

2,875,176

LINEAR POLYESTER COMPOSITIONS CONTAINING THE CONDENSATION PRODUCT OF HYDROQUINONE AND ALLYL ALCOHOL AS A HEAT STABILIZER

De Walt S. Young, Roger M. Schulken, Jr., and Louis D. Moore, Jr., Kingsport, Tenn., assignors to Eastman Kodak Company, Rochester, N. Y., a corporation of New Jersey No Drawing. Application September 21, 1956
Serial No. 611,372

4 Claims. (Cl. 260—45.95)

This invention relates to the heat stabilization of synthetic linear polyesters of high molecular weight. Linear polyesters are extensively used in textile fibers, which are subject to heating in the processes of washing, drying at elevated temperatures, ironing and pressing. Linear polyesters are also used in films and shaped articles which are subjected to heating in their various uses, such as in electrical insulation and the like. Heating tends to degrade linear polyesters, as has been discussed by H. A. Pohl in Journal of the American Chemical Society 73, 5660–5661 (1951), and by I. Marshall and A. Todd in Transactions of the Faraday Society 49, 67–78 (1953).

When polyesters are heated at elevated temperatures they degrade in physical properties and in molecular weight as measured by the logarithmic viscosity number, $\{\eta\}$, defined by the equation $$\{\eta\} = \frac{ln(\eta/\eta_0)}{C}$$

where $\eta_0$ and $\eta$ are the viscosities respectively of pure solvent and of a solution containing C grams of polymer per 100 cc. of solvent. The logarithmic viscosity numbers reported herein were measured in a 60:40 mixture by weight of phenol:tetrachloroethane at a polymer concentration of about 0.23 gram/100 cc.

In the course of our investigation of the thermal breakdown of linear polyesters, we have found that the addition of certain compounds to the polyesters retards thermal degradation. The mechanism of this protection is not completely understood, but it has been shown that oxygen has a detrimental effect; therefore, the compounds may be functioning as antioxidants. However, we have found that a great many antioxidants are not stabilizers for linear polyesters.

We have found that linear polyesters can be heat stabilized by the incorporation of a small proportion of the condensation product of hydroquinone and allyl alcohol. This condensation product was prepared as follows: 220 grams (2 moles) of hydroquinone and 400 cc. of 85% phosphoric acid were mixed in a glass reactor provided with a reflux condenser, a strong agitator, and a thermometer. Next, 232 grams (4 moles) of allyl alcohol was introduced gradually at 100° C. over a period of two hours. After an additional two hour stirring period, the mix was cooled and diluted with one liter of water. The water was decanted and the solid, brittle mass remaining was washed several times with water. Finally, the solid was ground into a powder and slurried with water, and residual acid was neutralized with sodium bicarbonate. After filtering and drying, the product weighed 362 grams.

The hydroquinone-allyl alcohol condensation product can be incorporated into the linear polyester resin either by mixing it into the molten resin, which may then be extruded or molded, or by adding it to a solution or dope of the resin, which may then be cast as a film or spun as a filament. Concentrations of from 0.1 to 10 parts by weight of hydroquinone-allyl alcohol condensation product per 100 parts by weight of linear polyester may be used; we prefer to use from 0.3 to 3 parts per 100 parts of polyester.

The effectiveness of the stabilizer was tested by placing film strips of the polyester containing the stabilizer in a 200° C. air oven for a given length of time. The values of $\{\eta\}$ were determined before and after the heating. A comparison of these figures with those obtained on a blank of the same bath of polyester provided a measure of the stabilizing effect of the additive.

In the examples given below, the hydroquinone-allyl alcohol condensation product was incorporated in the indicated proportions with a linear polyester designated as 1:1-S:P, made from a 1:1 mole ratio of 1,5-pentanediol: 4,4'-dicarboxyphenyl sulfone,

HOOC—$C_6H_4$.$SO_2$.$C_6H_4$—COOH and with a linear polyester designated as 1:1:2–S:C:P, made from a 1:1:2 mole ratio of 4,4'-dicarboxyphenyl sulfone:azelaic acid:1,5-pentanediol.

| Examples | Parts Hydroquinone-Allyl Alcohol Condensation Product per 100 Parts Polyester | Polyester | {η} | |
|---|---|---|---|---|
| | | | Original | After 15 hrs. |
| 1 | 1 | 1:1-S:P | 0.59 | 0.54. |
| | None | Same | 0.62 | 0.50. |
| 2 | 1 | 1:1:2-S:C:P | 0.95 | 1.02. |
| | None | Same | 0.95 | Insoluble. |

The insolubility of the blank in Example 2 after heating indicates that considerable degradation of the sample had taken place during the 15 hours of heating.

What we claim as our invention and desire to be secured by Letters Patent of the United States is:

1. A polyester composition comprising a linear polyester selected from the group consisting of the linear polyesters of 4,4'-dicarboxyphenyl sulfone and 1,5-pentanediol and the linear polyesters of 4,4'-dicarboxyphenyl sulfone, azelaic acid and 1,5-pentanediol stabilized against degradation by heat by a content of from 0.1 to 10 parts by weight of the polymeric condensation product of equivalent amounts of hydroquinone and allyl alcohol condensed under acid conditions, per 100 parts by weight of polyester.

2. A polyester composition comprising a linear polyester selected from the group consisting of the linear polyesters of 4,4'-dicarboxyphenyl sulfone and 1,5-pentanediol and the linear polyesters of 4,4'-dicarboxyphenyl sulfone, azelaic acid and 1,5-pentanediol stabilized against degradation by heat by a content of from 0.3 to 3 parts by weight of the polymeric condensation product of equivalent amounts of hydroquinone and allyl alcohol condensed under acid conditions, per 100 parts by weight of polyester.

3. A polyester composition comprising a linear polyester of 4,4'-dicarboxyphenyl sulfone and 1,5-pentanediol, stabilized against degradation by heat by a content of from 0.3 to 3 parts by weight of the polymeric condensation product of equivalent amounts of hydroquinone and allyl alcohol condensed under acid conditions, per 100 parts by weight of polyester.

4. A polyester composition comprising a linear polyester of 4,4'-dicarboxyphenyl sulfone, azelaic acid and 1,5-pentanediol, stabilized against degradation by heat by a content of from 0.3 to 3 parts by weight of the polymeric condensation product of equivalent amounts of hydroquinone and allyl alcohol condensed under acid conditions, per 100 parts by weight of polyester.

References Cited in the file of this patent

UNITED STATES PATENTS

| | | |
|---|---|---|
| 2,632,751 | Anderson | Mar. 24, 1953 |
| 2,635,089 | Anderson | Apr. 14, 1953 |